United States Patent
Spurgeon et al.

(10) Patent No.: US 6,903,841 B2
(45) Date of Patent: Jun. 7, 2005

(54) DECORATING SYSTEM FOR EDIBLE ITEMS

(75) Inventors: Stephen L. Spurgeon, Boulder, CO (US); Ronald B. Kammerer, Jr., Broomfield, CO (US)

(73) Assignee: DecoPac, Inc., Minneapolis, MN (US)

( * ) Notice: Subject to any disclaimer, the term of this patent is extended or adjusted under 35 U.S.C. 154(b) by 214 days.

(21) Appl. No.: 10/058,629

(22) Filed: Jan. 28, 2002

(65) Prior Publication Data

US 2002/0135651 A1 Sep. 26, 2002

Related U.S. Application Data

(63) Continuation of application No. 09/144,046, filed on Aug. 31, 1998, now abandoned.
(60) Provisional application No. 60/079,335, filed on Mar. 25, 1998.

(51) Int. Cl.[7] .............................. G06F 15/00; A23L 1/10; B41J 3/407; A01J 27/02
(52) U.S. Cl. ....................... 358/1.18; 358/1.9; 426/383; 426/104; 426/105; 347/106; 347/102; 118/13
(58) Field of Search ................................. 358/1.18, 1.9; 700/204, 66; 426/383, 104, 249, 87, 105; 101/483, 37; 347/106, 102; 118/13, 14

(56) References Cited

U.S. PATENT DOCUMENTS

| 161,740 A | 4/1875 | Dawkings .................... 137/286 |
| 196,885 A | 9/1877 | Baumann .................... 362/180 |
| 422,430 A | 1/1890 | Krier ........................ 106/31.72 |

(Continued)

FOREIGN PATENT DOCUMENTS

| GB | 161740 | 4/1921 |
| GB | 196885 | 3/1924 |
| GB | 422430 | 1/1935 |
| GB | 543427 | 2/1942 |
| GB | 628886 | 9/1949 |
| GB | 786428 | 11/1957 |
| JP | 59-118049 | 7/1984 |
| JP | 60-126057 | 7/1985 |
| JP | 2-163058 | 6/1990 |
| LU | 422430 | 2/1935 |
| WO | WO 95/01735 | 1/1995 |
| WO | WO 97/27759 | 8/1997 |

OTHER PUBLICATIONS

In re Young, 25 USPQ 69 (CCPA 1935).
Geller–Shin, "Tools of the Trade: Yum! The Edible Image is Served," Photographic (Sep. 1988), 1–page article.
Massaro, "Enterprise Stirs up Picture–Perfect Cakes," Rocky Mountain News, (Oct. 14, 1988), 1–page article.

*Primary Examiner*—Twyler Lamb
(74) *Attorney, Agent, or Firm*—Fish & Richardson P.C., P.A.

(57) ABSTRACT

A system for creating a decorative edible item from a selected image. The system includes at least one image source, such as a scanner and/or a library of stored images, a controller unit and a printer. An edible media is inserted into the printer. The user then selects the image source, such as the scanner for scanning in a photograph reminiscence of a person or event being honored. The size of the printed image is then selected as well as the number of copies to be printed from the image. The print sequence is then activated. The controller unit applies color correction to the digital image and converts the digital image into printer control signals to operate the printer. The printer then prints a rendition of the image with edible inks as the edible media travels through the printer. A high-quality pictorial rendition of the image is thus created. The printed edible media can then be applied onto a product, shipped to a separate location or eaten as is.

17 Claims, 9 Drawing Sheets

U.S. PATENT DOCUMENTS

| | | | |
|---|---|---|---|
| 543,427 A | 2/1895 | Culpitt | 178/18.05 |
| 628,886 A | 9/1899 | C. Jamin N.V. | 402/2 |
| 786,428 A | 11/1905 | White | 379/180 |
| 919,736 A | 4/1909 | Loesch | 426/87 |
| 1,605,903 A | 11/1926 | Schuler | 426/515 |
| 2,123,215 A | 7/1938 | Thomas | 426/279 |
| 2,347,022 A | 4/1944 | Austin | 101/129 |
| 2,353,594 A | 7/1944 | Seagren | 426/104 |
| 2,394,322 A | 2/1946 | McKee | 426/87 |
| 2,526,811 A | 10/1950 | Dawson | 83/132 |
| 2,578,150 A | 12/1951 | Rathke | 426/132 |
| 2,610,588 A | 9/1952 | Seagren et al. | 426/104 |
| 2,895,832 A | 7/1959 | Bersey | 426/87 |
| 3,057,730 A | 10/1962 | Morck | 426/291 |
| 3,192,086 A | 6/1965 | Gyurk | 101/129 |
| 3,649,347 A | 3/1972 | Battista | 428/323 |
| 3,654,894 A | 4/1972 | Rohrbacher et al. | 118/17 |
| 3,658,977 A | 4/1972 | Baker | 101/129 |
| 3,776,185 A | 12/1973 | Kawasaki | 118/406 |
| 3,852,494 A | 12/1974 | Williamson | 426/383 |
| 4,024,287 A | 5/1977 | Golchert | 426/383 |
| 4,061,783 A | 12/1977 | Hoffman et al. | 426/87 |
| 4,168,662 A | 9/1979 | Fell | 101/492 |
| 4,285,978 A | 8/1981 | Quinlivan | 426/87 |
| 4,292,917 A | 10/1981 | Ezaki | 118/16 |
| 4,388,862 A | 6/1983 | Thomas, Jr. | 101/126 |
| 4,409,893 A | 10/1983 | Newman et al. | 101/129 |
| 4,455,320 A | 6/1984 | Syrmis | 426/383 |
| 4,466,994 A | 8/1984 | Hubbard et al. | 427/542 |
| 4,531,292 A | 7/1985 | Pasternak | 33/18.1 |
| 4,537,647 A | 8/1985 | Foster | 156/245 |
| 4,548,825 A | 10/1985 | Voss et al. | 426/383 |
| 4,560,562 A | 12/1985 | Schroeder | 426/87 |
| 4,578,273 A | 3/1986 | Krubert | 426/87 |
| 4,592,916 A | 6/1986 | Akesson | 426/517 |
| 4,668,521 A | 5/1987 | Newsteder | 426/87 |
| 4,668,523 A | 5/1987 | Begleiter | 426/104 |
| 4,670,271 A | 6/1987 | Pasternak | 426/90 |
| 4,785,313 A | 11/1988 | Higuma et al. | 347/105 |
| 4,832,966 A | 5/1989 | Newsteder | 426/87 |
| 4,843,958 A | 7/1989 | Egosi | 101/2 |
| 4,910,661 A | 3/1990 | Barth et al. | 700/66 |
| 4,985,260 A | 1/1991 | Niaura et al. | 426/87 |
| 5,006,362 A | 4/1991 | Hilborn | 427/2.23 |
| 5,017,394 A | 5/1991 | Macpherson et al. | 426/383 |
| 5,032,416 A | 7/1991 | Niaura et al. | 426/383 |
| 5,035,907 A | 7/1991 | Phillips et al. | 426/383 |
| 5,081,917 A | 1/1992 | Masuda | 99/450.2 |
| 5,255,352 A | 10/1993 | Falk | 345/582 |
| 5,334,404 A | 8/1994 | Garcia et al. | 426/383 |
| 5,485,189 A | 1/1996 | Ebata | 347/102 |
| 5,505,775 A | 4/1996 | Kitos | 118/14 |
| 5,547,507 A | 8/1996 | Ciaramita | 118/13 |
| 5,711,791 A | 1/1998 | Croker et al. | 106/31.35 |
| 5,795,395 A | 8/1998 | Ben-Matitavhu et al. | 118/712 |
| 6,045,220 A | 4/2000 | Kiyohara et al. | 347/104 |
| 6,058,843 A * | 5/2000 | Young | 101/483 |

* cited by examiner

DECORATING SYSTEM FOR EDIBLE ITEMS

RELATED APPLICATIONS

This application is a continuation of U.S. Ser. No. 09/144,046 filed Aug. 31, 1998, now abandoned, which is based on the subject matter of provisional patent application Ser. No. 60/079,335, field on Mar. 25, 1998.

FIELD OF THE INVENTION

This invention relates to the field of digital imaging on edible items.

BACKGROUND OF THE INVENTION

Decorative food products, such as cakes, are popular items, particularly for special occasions, such as birthdays, holidays, weddings, anniversaries and other celebratory events. These items are typically purchased from bakeries, since they require some skill and/or apparatus to create. Previously, these items were created from colored frostings applied manually by trained bakery chefs. The creation of these hand-decorated items were time and labor intensive. Normally a customer will either buy a stock item from the bakery or else place an order for a special item then return to pick the order up at a later date. These manually created items are at best a stylized rendition of the desired image and limited by the skill of the baker.

There have been a number of attempts previously to provide alternatives to the manually created decorating process. One such alternative that is presently widely used is the use of pre-made decorative items which are then placed on the food product. These pre-made items are produced in bulk and inventoried until use. The use of such pre-made decorative items precludes uniquely decorated and/or personalized decorations. Also, these pre-made decorative items must be either ordered, which requires a long lead time, or stored in inventory at the risk of under ordering or over ordering, as well as the cost of such inventory. Another alternative has been to utilize an automated system for decorating cakes.

One example of such a system is disclosed in U.S. Pat. No. 4,910,661, issued to Barth et al. This system uses a video system to create an image, which is then applied to the cake by controlled movement of an X-Y table beneath a set of spray nozzles which dispense colored liquid onto the cake. This system is cumbersome and complicated and requires operator intervention.

One other system is disclosed in U.S. Pat. No. 4,578,273, issued to Krubert. This system uses a series of stations through which the food product is conveyed. At one station, a series of colored images are stamped onto the food product to form an image. This process is geared toward mass production of products having identical images since the stamps are formed in a single image. The stamps must be changed in order to create another image.

Another prior attempt is disclosed in U.S. Pat. No. 5,505,775, issued to Kitos. This system utilizes an integrated work surface controlled with a computer system. An image is scanned into the computer system. The computer system then uses a motion control system to manipulate a drop on demand colorant expulsion system over a cake carried on the work surface to reproduce the scanned image. This system requires a flat surface on the top of the cake since it is incapable of vertical axis movement. The choice of colors is limited to the three-color single cartridge colorant expulsion system.

These systems also produce the decorations and images directly onto the food product. Since these food products are produced at the bakery, the decorated food product must then be transported to the event. Many times the decorated food product is damaged in transit. Also, this increases the expense many times in transporting the entire decorated food product.

None of these systems are truly capable of providing an on-demand system that can create a near-photographic reproduction of an image in an edible format. There is a need for such a system.

SUMMARY OF THE INVENTION

The present invention solves this and other problems by providing a process and a system for creating an edible product from a selected image in an "on demand" system. The product is fully edible and can be applied onto a cake or other food product at the time of creation, easily transported to another location for application or eaten as is.

The system of one preferred embodiment of the present invention includes at least one image source for selection of a desired image, a controller unit for receiving the selected image and a printer for printing the selected image as received from the controller unit onto an edible media with edible inks. The system is designed to be easily used without the need of extensive training or computer skills. The system is also designed to be flexible in the capability of accommodating various sizes of edible media and in the source of the images.

An edible media is first inserted into the printer of the system. This edible media is specially formulated not only be able to render a high quality pictorial rendition of a selected image on the application of specially formulated edible inks, but must be able to travel along a media path in the printer itself without damage. This media path normally includes the bending of the edible media along with friction rollers. Once the edible media has been inserted into the printer path, then the controller unit is used to operate the system.

The controller unit, in a preferred embodiment of the present invention, can be a separate computer system, an enclosed processor or any other type of digital processing unit. In the preferred embodiment, the controller unit uses a touch screen interface. A variety of menus which are accessed by this touch screen interface allows the system to be easily operated. Once the edible media has been inserted into the printer, the user must first select an image source. Multiple image sources are provided in the preferred embodiment. The first image source, in the preferred embodiment of the invention, is a scanner. The user can insert a personal photograph, such as of a person or event being honored, onto the scanner. The photograph is then scanned and the digital image transmitted to the controller unit. A second image source in the preferred embodiment is a library of images stored in the controller unit or on external storage devices. The user selects an image from a catalog and inputs this selection by way of the touch screen interface into the controller unit. If that selected image is available, then the controller unit verifies the selection. Other image sources include any available digital image source, or even analog sources which are then converted to digital images. Examples of such digital image source include without limitation: film/slide scanners, digital cameras, digital videos, networked image libraries, digital tablets, external storage devices such as floppy disks, Zip drives, superdrives, cd-rom or other sources of digital data.

The user can then select the size of the printed image from a preset selection or else selects a custom size. The number of copies to be printed is also selected. A single image may be printed on multiple media, multiple copies can be repeated onto a single media (such as for use on cupcakes), images can be "tiled" onto multiple media to form a larger image or multiple separate images can be printed onto a single media. Also, separate images can be overlayed onto one another for additional effect. Cutting or cropping software can also be incorporated therein to manipulate the image. Once the image source, the printed image size and the number of copies have been selected, the user then activates the print mode to either scan the photograph, retrieve the stored image or otherwise obtain the digital data from the selected image source.

The controller unit then performs color correction on the digital data from the image source and converts this processed data into printer control signals. These signals operate the printer to transport the edible media along the printer media path and adjacent the printheads of the printer. The printer prints a rendition of the image onto the edible media with edible inks.

The edible inks have been specially formulated for use in the printer, which in the preferred embodiment, is an inkjet printer. The edible inks are also formulated in cyan, magenta, yellow and black to faithfully render images as percentages of these colors in accordance with the CMYK color model. The system can also use other color models as well, including without limitation RGB, LAB, HSB, Pantone, Hexachrome and other color models. This improves the precision of the printed image by providing adherence to color matching systems.

The printer, in the preferred embodiment of the invention, includes most, if not all, types of inkjet printers. These include thermal inkjet, solid piezo inkjet, liquid piezo inkjet, continuous inkjets, valve inkjets, electrostatic inkjets and airbrush print technology. Other types of printers are usable as well as long as the accurate color matching of the edible inks are attainable.

Once the edible media has traveled through the printer and the image printed thereon with the edible inks, the printed edible media can be removed from the printer. The printed edible media can then be placed on a food product at the point of printing, transported to a separate location for application or even consumed as is. The system is flexible in its capability to print different sizes depending on the food product to be decorated. Also, since the edible media is relatively thin and sturdy, it can be transported separately from the food product to minimize damage to the decorations. The system is also designed to be easily updated and for its settings to be easily adjusted.

The system can be used in a bakery environment as a stand-alone system or used in a network, such as a LAN, WAN, MAN, Intranet or even an Internet system. For instance, a controller unit with the image sources can be set up on a kiosk. A user can input or select their desired image, choose the correct settings and activate the system. Once the image is scanned or retrieved, the user may leave. The controller unit processes the information and transmits the information to a remote site, such as a central bakery. The finished media is either applied onto a product and shipped to the user, or else shipped by itself to the user. Another variation includes an Internet web site where the user can either upload their image or select from an image library. The user would then also make the other selections relative to the media size, copies and the like. This information would then be transmitted to the printer, which could be at any location, and then the printed media shipped to the user.

The unique and specially formulated edible media and edible inks allow commercially available print systems to be utilized. The previous decorative systems require specially designed print systems. Also, the present system is truly an "on-demand" system. The printed image on the edible media can be created in a mere few minutes. Also, the printed image can be rendered from almost any photograph or digitally created or converted image into a near photographic quality edible image.

These and other features are described in greater detail in the ensuing description of a preferred embodiment and in the drawings.

DETAILED DESCRIPTION OF A PREFERRED EMBODIMENT

Figure 1:
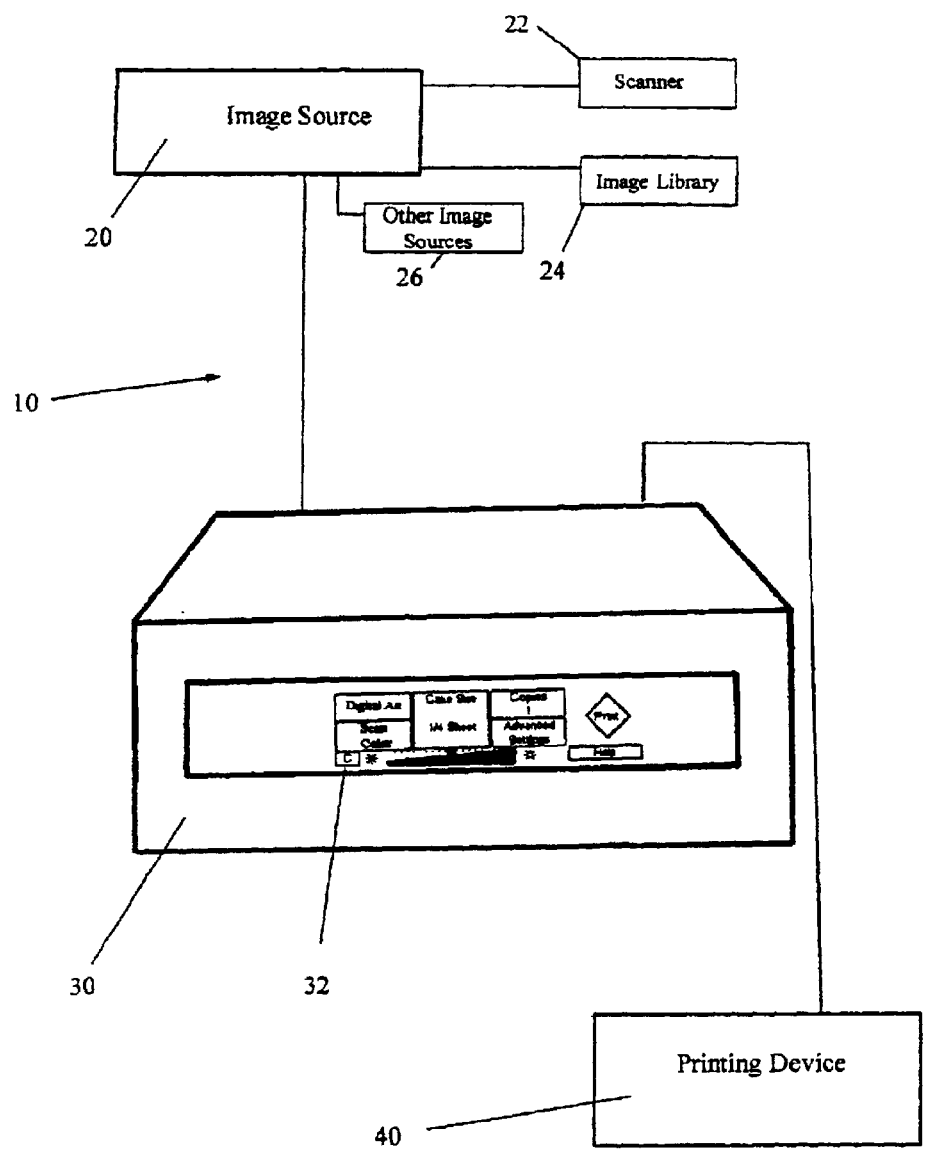
FIG. 1 is a schematic of a preferred embodiment of the decoration system of the present invention.

Referring in more detail to the drawings, as shown in FIGS. 1–20, a preferred embodiment of the present invention is described In this particular preferred embodiment a system 10 for creating an edible product from a selected image is illustrated. It is to be clearly understood that this preferred embodiment is provided for descriptive purposes only and is not meant to unduly limit the scope of the inventive concept. Other embodiments are included within the inventive concept as set forth in the appended claims.
System Overview The system 10 of the present invention, as illustrated in FIG. 1 includes at least one image source 20, a controller unit 30 having an interface screen 32 and a printer 40. The image source 20 receives or creates an image which is then sent in digital form to the controller unit 30. The controller unit 30, in the preferred embodiment, is a computer processor unit which controls the operation of the input devices to select an image or an image input device, receive the digital version of such an image, manipulate the image if necessary and then send printer control signals to the printer based on the final image. The printer 40 then prints the image using edible inks onto an edible food item.

The preferred embodiment is illustrated as an integrated system. It is to be clearly understood that each of the components of the present invention can be detached from this system and at a separate physical location. Each of these components need only be accessible to the other components by some method of digital transmission, such as cables, telecommunication lines, wireless or any other data transmission system. Also, the data could be output from any of the components onto external storage media, such as floppy disks, zip drives, cd-rom or any other storage media and then retrieved into the other components.

Image Source

Figure 2:
FIG. 2 is an illustration of a catalog of Digital Art images.

The image source 20 can be one or more of various devices. In the preferred embodiment, the image source 20 include a scanner 22, a library of digital art 24 stored on either a storage drive in the controller unit 30 or on an external storage device, and other image sources indicated at 26 which include without limitation film/slide scanners, digital cameras, networked image libraries, and any other digital image source. The scanner 22 can be a flatbed scanner or other types of scanner such as a drum scanner or a through feed scanner. The scanner allows an image to be rendered from personal photographs, such as of a person or event which is to be honored. Also, a computer processing unit may be connected to the controller unit 30 to create, edit and/or manipulate images with commercially available or proprietary software packages. The library of images are designated by a name, or in the preferred embodiment, by an Item Number. A catalog of thumbnail images with the designated Item Number, an example of which is shown in FIG. 2, is used to select the desired image from the library.

Controller Unit

The controller unit 30 includes, in the preferred embodiment, includes a computer processing unit, preferably a Raster Image Processor (RIP). However, a conventional computer processor can be used as well. Also, any other processing units which can digitally process the signals from the image sources can be used. The processor is operated via a touch screen user interface 32. It is to be expressly understood that other embodiments utilizing other types of input devices, such as a detached touch screen, keypads, joy sticks, voice commands, and the like are within the scope of the present invention. The touch screen user interface 42 allows the user to select from a variety of commands to customize an image or else simply use the default commands to process a standard size and type of image.

Figure 3:
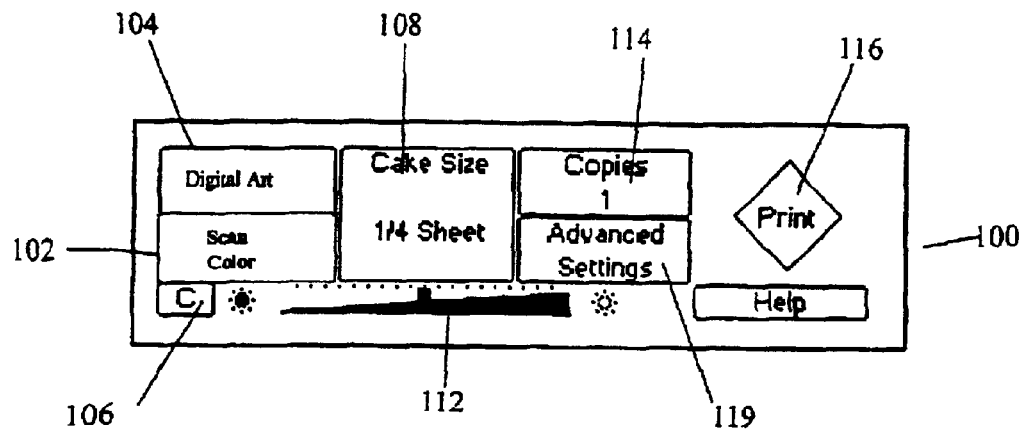
FIG. 3 is a view of the first-level display menu of the controller unit of the embodiment of FIG. 1.
Figure 4:
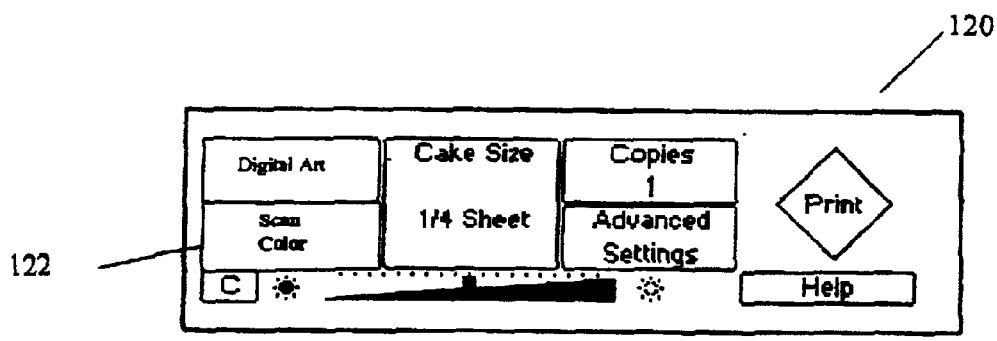
FIG. 4 is a view of display menu of FIG. 3 on the Scan Black & White mode.
Figure 5:
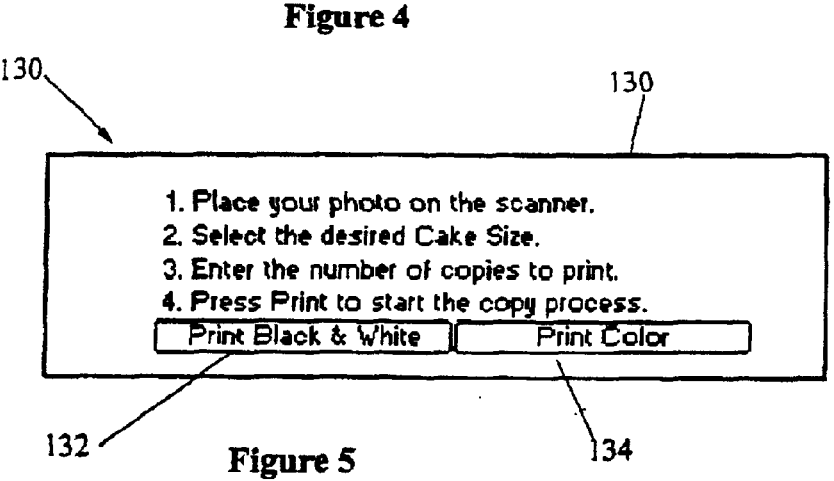
FIG. 5 is the display menu of FIG. 3 on the instructions for scanning mode.

The first-level display screen 100, as shown in FIG. 3, provides a relatively self-explanatory operation menu on touch screen user interface 32. The user simply selects the image input source, which in this embodiment includes Scan button 102 indicating the scanner 22 and Digital Art button 104 indicating the Digital Art source 24 stored on the storage drive in the controller unit 30. The default value for the Scan button 102 is for the scanned image to be in color. However, if the image is to be scanned as a black and white image, then Scan button 122 is touched by the user. The display screen 32 displays the directions on menu 130, as shown in FIG. 5 to operate the system. The user is directed to place the photograph from which the image is to be created on the scanner 22, select the appropriate cake size, touch the number of copies that are to be created and then select the print to start the process. If the image is to be printed in color, the Print Color button 134 is touched and display screen 32 reverts back to the display shown in FIG. 3. If the image is to be printed in black & white, then Print Black & White button 132 is touched and the display screen 32 then reverts back to the display shown in FIG. 4.

Figure 6:
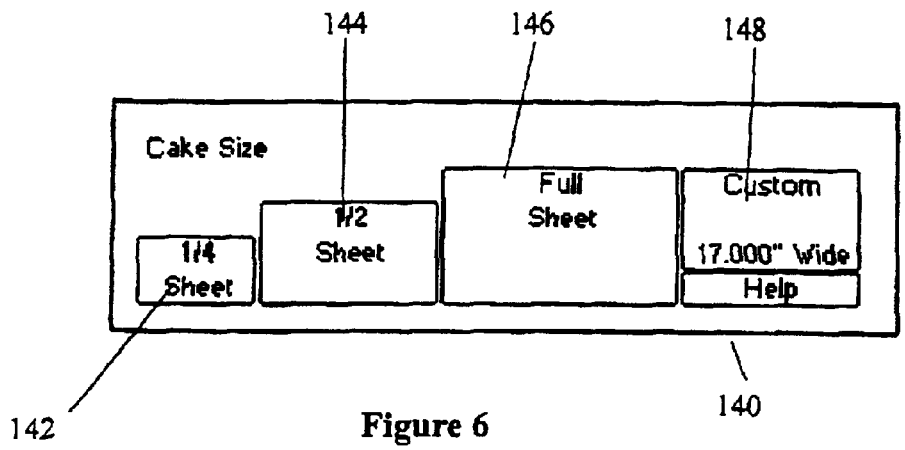
FIG. 6 illustrates the Cake Size menu display.

The user then selects the desired cake size by touching the Cake Size button 108. Menu 140, as shown in FIG. 6, is then displayed. The values for the different cake sizes include standard sizes of cakes, as is known in the baking industry. For instance, ¼ Sheet button 142 indicates a quarter sheet size, ☐ Sheet button 144 indicates a one-half sheet size and Full Sheet button 146 indicates a full-sheet size. Custom button 148 allows a custom size to be created up to a width of seventeen inches. The length will be automatically calculated from the original image's aspect ratio or length to width ratio.

The brightness/darkness of the original image can be adjusted by the brightness/darkness balance slider 112, as shown in FIG. 3. This allows the user to compensate for images that are overly light or overly dark. Copies button 114 allows the user to select the number of copies which are to be printed. For instance, if a number of identical images are to be created for multiple food products, then that number can be selected. Also, selections can be made as to printing of multiple identical images onto a single media, the printing of distinct multiple images printed onto a single image, multiple images overlayed onto the media, a single image printed in separate tiles onto multiple media or other image effects. Also, in one embodiment of the invention, a multiple feed system for feeding blanks into the printer can be used to automate the process.

Once the image source, the cake size and the number of copies has been selected, then the user touches the Print button 116. The scanner, if selected as the image source, is activated and scans an image based on the photograph which had been placed on the scanner. This image is sent by digital signals to the controller unit 30 which then converts those digital signals to printer control signals to the printer. The image is printed, as discussed in greater detail below, on an edible food item with edible inks in the size selected. This printed edible food item can then be placed on the cake or other food product.

Figure 7:
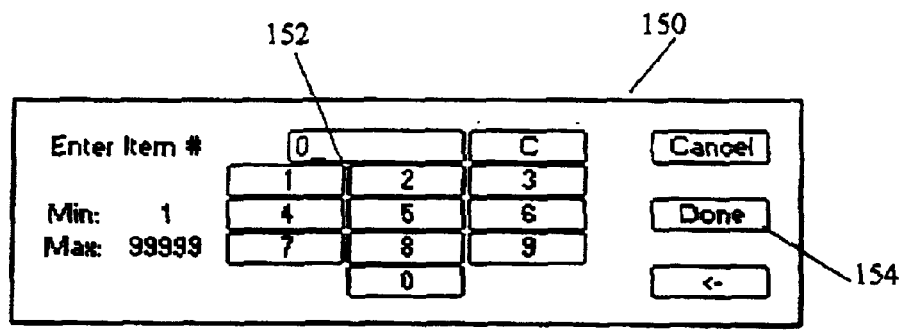
FIG. 7 illustrates the Digital Art selection menu display.

The controller unit also provides other options for the user. For instance, the source of the image to be created can be selected via Digital Art button 104 to be from the library of Digital Art images. These Digital Art images can be licensed clip art images, such as shown in FIG. 2, or other images such as a personal data base of images. If the user decides to use an image from the library instead of scanning an image, then Digital Art button 104 is selected. A key pad menu 150, as shown in FIG. 7, is then displayed on the touch screen 32. The user selects the Item Number for the desired image from the catalog, an example of which is shown in FIG. 2, touches the appropriate numeric buttons 152 on the key pad menu 150 and selects the Done button 154. The touch screen 32 will then display menu 160, shown in FIG. 8, confirming the selection and availability of that image.

Figure 9:
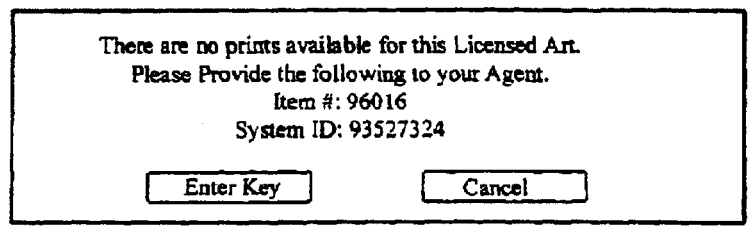
FIG. 9 illustrates the non-verification of the selection of the Digital Art Item display.

If the library does not have that image or the image is a limited use image and the licensed number of uses has been previously selected, then the touch screen 32 displays a message to that effect, shown in FIG. 9. The user can then contact the appropriate source and obtain a "key" number which will activate the licensed image for additional uses or else select another image. Once an image has been selected, the user can then select the size and number of copies and print the image.

Figure 8:
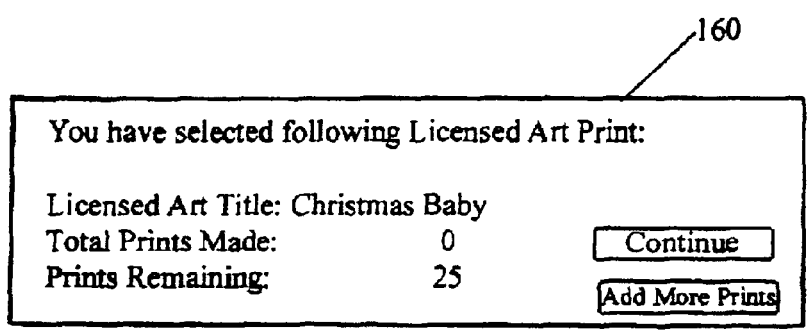
FIG. 8 illustrates the verification of the selection of the Digital Art Item display.
Figure 12:
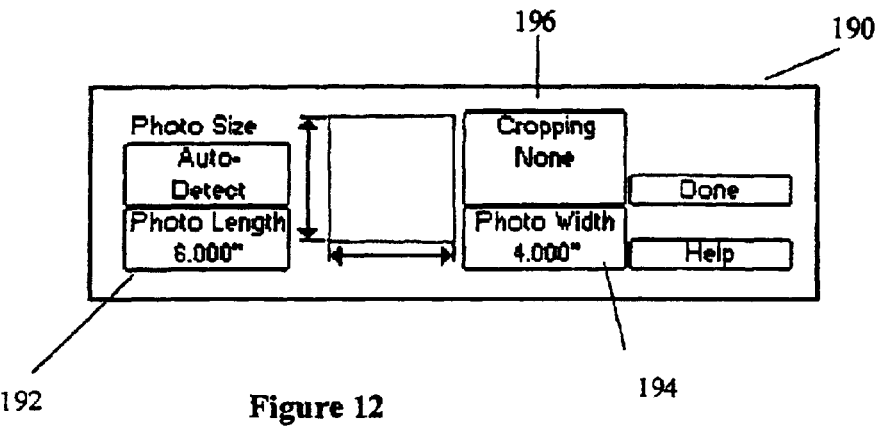
FIG. 12 illustrates the Photo Size Manual menu display.
Figure 13:
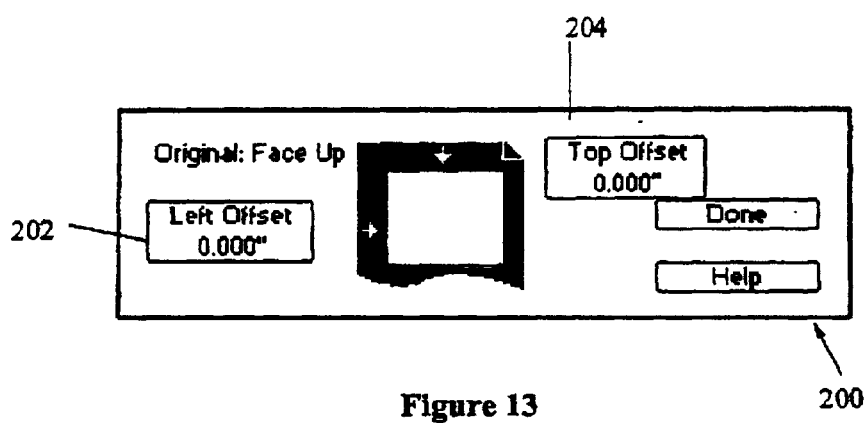
FIG. 13 illustrates the Cropping menu display.
Figure 14:
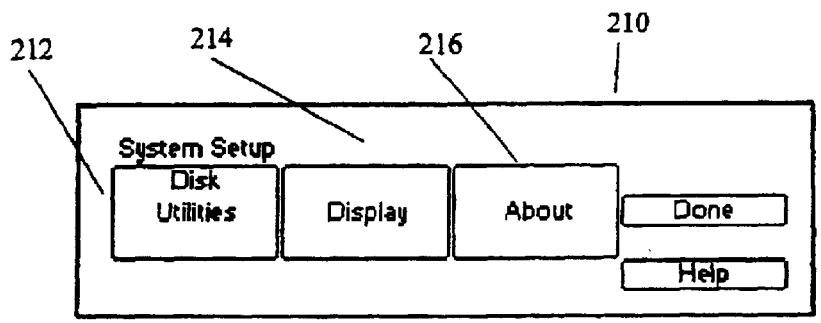
FIG. 14 illustrates the System Setup menu display.

The controller unit 30 also includes other custom features. The user can select the Advanced Settings button 119 on the display screen illustrated in FIG. 3. The touch screen 32 then displays menu 170, shown in FIG. 10. Several custom features are selectable from menu 170. One custom feature is to either have the scanner automatically detect the size of the image to be scanned or manually set the size. For instance, if the scanner is having difficulties automatically detecting an entire photo due to a light background color, the user can provide the measurements. The user selects the Photo Size Auto-Detect button 172. The controller unit 30 then displays menu 180, shown in FIG. 11. If the Manual button 182 is selected, then menu 190, shown in FIG. 12 is displayed. The size of the image to be scanned is set by selecting appropriate values from the Photo Length button 192 and the Photo Width button 194. Key pad menus, similar to the key pad menu 150 shown in FIG. 8, are displayed once the Photo Length button 192 and the Photo Width button 194 are selected to set the appropriate size values.

The user can also crop an image by selecting the Cropping button 196 following the selection of Manual button 182. The Manual button 182 is first selected and then the Photo Length button 192 is selected to enter the crop box desired length and the Photo Width button 194 is selected to enter the crop box desired width. The Cropping button 196 is then selected displaying screen menu 200, shown in FIG. 13. The Left Offset button 202 and the Top Offset button 204 are selected and the desired values are entered in a key pad similar to display 150 of FIG. 7. These desired values allow the user to move the set crop box to the desired position in respect to the original image. With the crop box size and positioning, the scanner can now scan a specific portion of the original image and perform the cropping operation.

Figure 10:
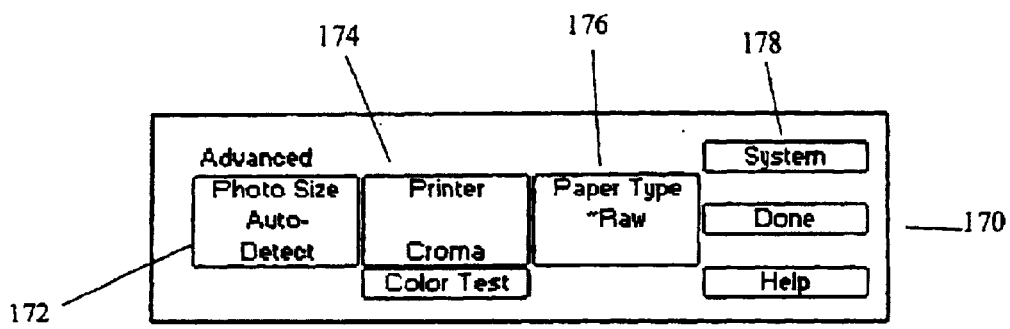
FIG. 10 illustrates the Advanced Settings menu display.
Figure 11:
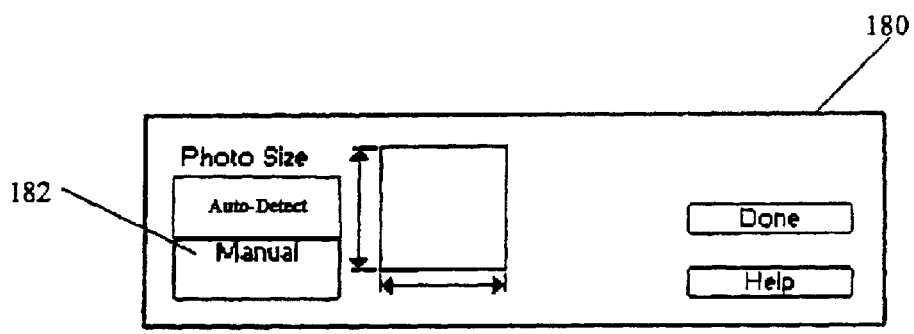
FIG. 11 illustrates the Photo Size Auto-Detect menu display.

The user can select from a menu of available printers by touching the Printer button 174, shown in FIG. 10. The screen will display the available printers from which the user can select. Once the desired printer is selected, the screen will automatically return to the Advanced Settings menu, shown in FIG. 10.

The user can also select the media on which the image is to be printed. These different types of media will be discussed in detail below. The user touches the "Paper Type" button 176 and selects from a displayed menu of available media. The screen will then automatically return to the Advanced Settings menu.

Figure 15:
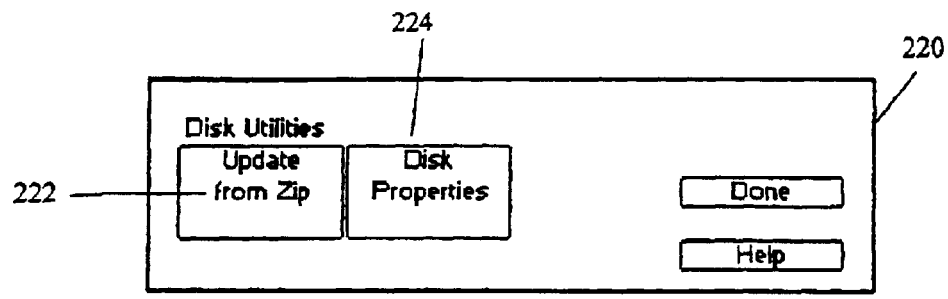
FIG. 15 illustrates the Disk Utilities menu display.
Figure 16:
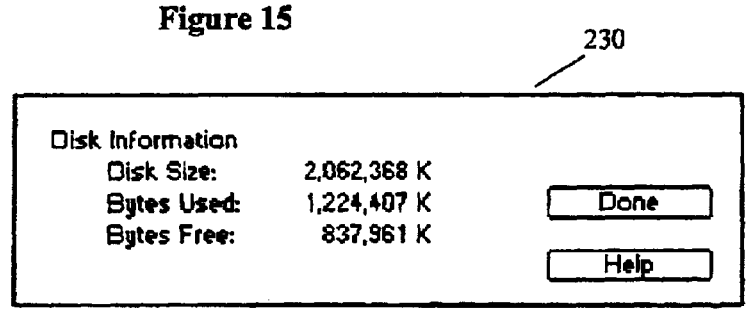
FIG. 16 illustrates the Disk Information menu display.
Figure 17:
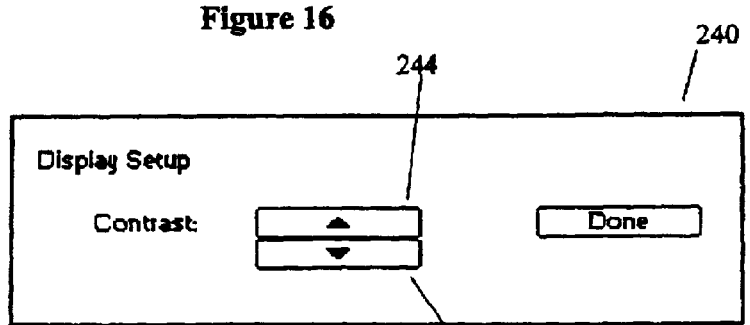
FIG. 17 illustrates the Display Setup menu display.

The user may also make changes to the system itself. The System button 178 is touched which causes menu 210, shown in FIG. 14, to be displayed. The user can update the controller unit 30 by touching the Disk Utilities button 212. Menu 220, shown in FIG. 15, is displayed. The user can then update the system (with newly released versions, library images or other updates) by touching the Update button 222 and selecting the source of the update. The user can also obtain information about the system by touching the Disk Properties button 224. This displays menu 230, shown in FIG. 16, which gives the current status of the system properties.

The user may also make changes to the display screen 32 itself. Touching the Display button 214, shown in FIG. 14, causes the menu 240, shown in FIG. 17 to be displayed. The contrast of the display screen 40 can then be adjusted by toggling the Arrow buttons 242, 244.

Figure 18:
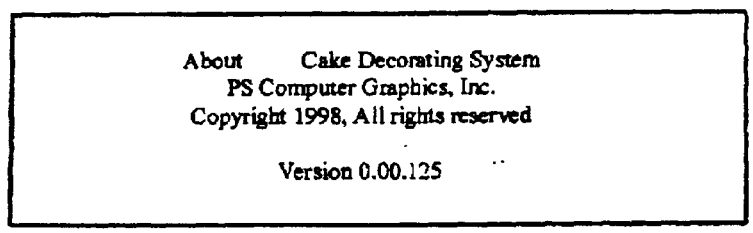
FIG. 18 illustrates the About menu display.

The user may also obtain information about the system by touching the About button 216. This displays information relating to the owner of the intellectual property rights of the system as well as the version number of the system, as shown in FIG. 18.

Each of the displayed menus also include a Help button, to assist the user with information regarding that particular menu, and a Done button, to return the user to the appropriate menu once the particular selection has been made.

Media

A critical feature of the system 10 of the present invention is the edible media on which the image is printed. This edible media, in the preferred embodiment, includes at least one edible layer and an edible coating. One embodiment of the edible layer of the media is a mixture of a sugar paste of varying thickness, referred to in a generic sense as fondant in the baking industry. In the preferred embodiment of the invention, the fondant has been specially formulated for several key features. First, the fondant must be able to depict high-quality pictorial images from the edible inks, described below. Second, the fondant must be able to travel through a printer without damage. Thus, the fondant must be of sufficient strength to be bent and manipulated through the conveying path of the printer, withstand the heat of the printing process and still being not overly thick to jam in the printer mechanism. Third, the fondant must be able to not detract from the taste of the food product on which it is to be applied.

The above preferred embodiment of the fondant of the present invention is described herein for explanatory purposes and is not meant to limit the scope of the present invention. This embodiment of the edible layer is formed from sugar, sorbitol, hydrogenated palm kernel oil, xanthan gum, locust bean gum, gum tragacanth, dried glucose syrup, glaze and water. Other variations of fondants may be used as well.

Other examples of edible layers are described in U.S. Pat. No. 5,017,394, assigned to the Lucks Company, and incorporated herein by reference. This type of edible layer is formed from a flour and/or starch base as opposed to the sugar base of the fondants. Another example of an edible layer is disclosed in U.S. Patent No. 4,334,404, issued to Garcia et al. an incorporated herein by reference.

Other types of edible layers used in the present invention include rice paper, wafer paper, and other edible substrates on which an image may be printed.

The edible media, of the preferred embodiment, also includes a coating on at least a portion of the edible layer. This coating enables the edible media to render a high quality pictorial image on the surface of the edible layer. Without this coating, the inks tend to run or bead or form an imperfect image. In one preferred embodiment, the coating is a very thin layer of calcium carbonate. This thin layer allows the inks to properly perform to render a high-quality pictorial image. Other coatings may be used as well.

Figure 19:
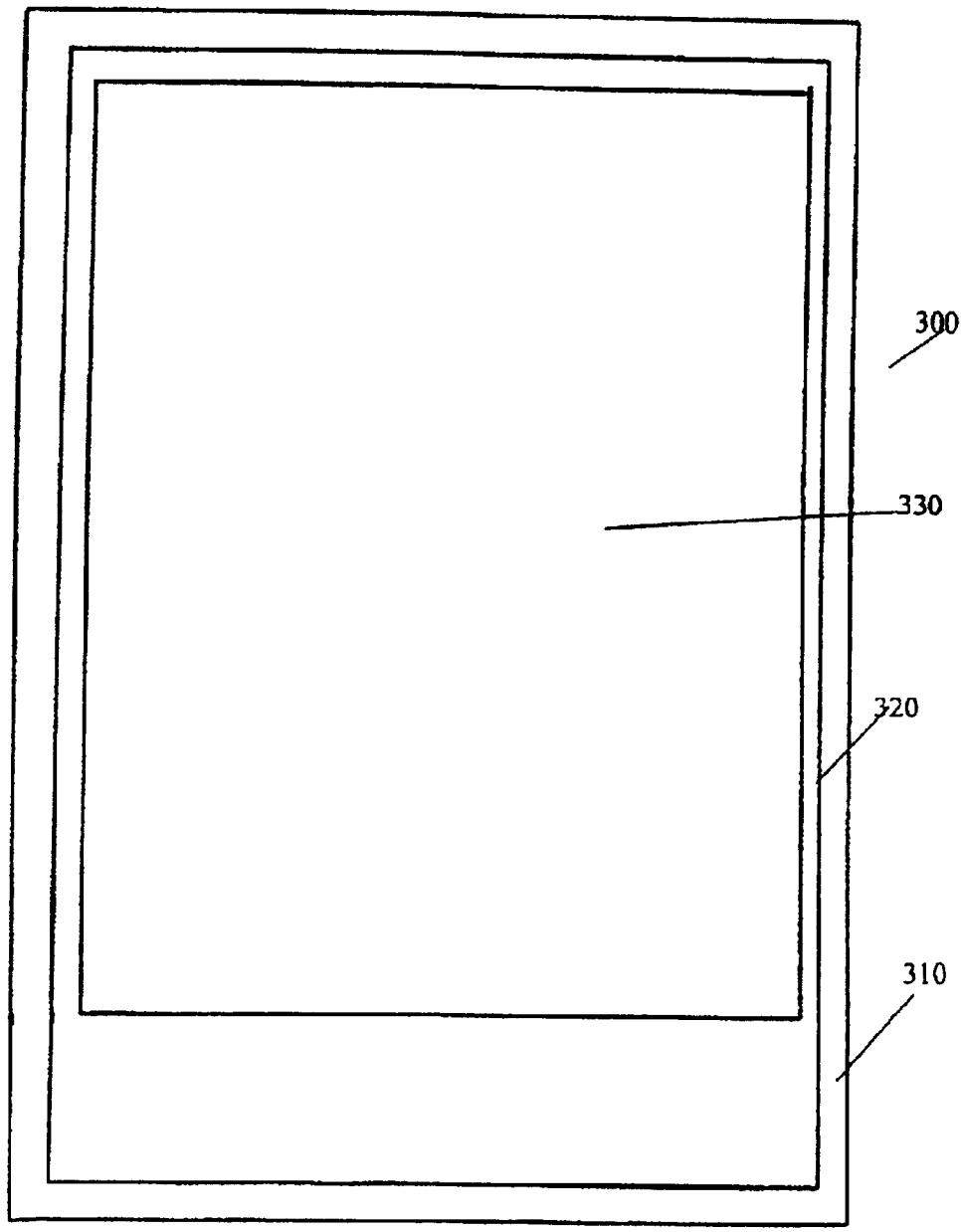
FIG. 19 is a top view of the edible media of the preferred embodiment of the present invention.
Figure 20:
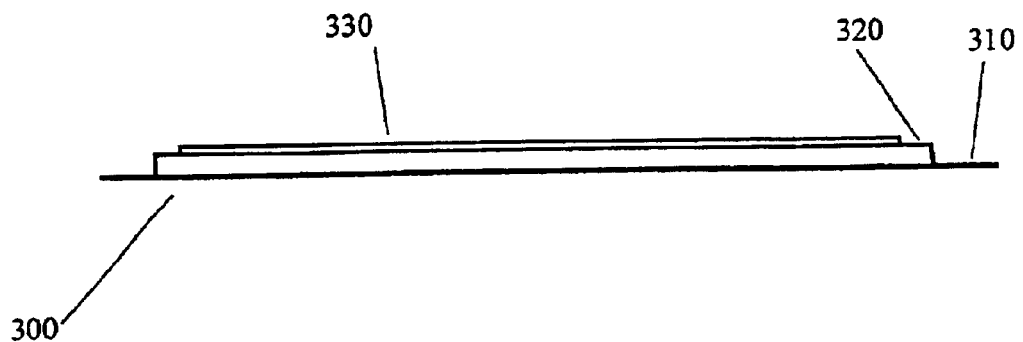
FIG. 20 is a cut-away view of FIG. 19 along lines 20—20.

A preferred embodiment of the media of the present invention is illustrated in FIGS. 19 and 20. The media 300 includes a release sheet 310 having a silicon coating, the edible layer 320 and a coating 330. The coating 330 is an edible film, as discussed above, upon which the edible inks may be printed to create a high quality pictorial image.

Edible Inks

Another key component of the present invention are the inks used in the printing process. These inks have been specially formulated from food grade colors to enable high quality, near-photographic images to be printed onto the edible media described above. These inks not only must be edible and have precise color-matching properties, they must also function in a manner similar to other commercially available inks in the printers. That is, unlike the prior art food decorating systems which have been specially designed to use existing food colors, the present inks have been designed be usable in commercial print systems and printing technologies, as described in detail below.

The edible inks of the preferred embodiment of the present invention are formulated to faithfully render images in accordance with the Cyan, Magenta, Yellow and Black (CMYK) color model. This provides adherence to most commercially available color matching systems, thus ensuring that the image obtained from the image source (scanner, library or other image input device) to be precisely printed onto the edible media. It is to be expressly understood that inks which are formulated to render high quality images in accordance with other color models are also within the scope of the present invention. For instance edible inks which are formulated in accordance with color models including without limitation RGB, LAB, HSB, Panatone, Hexachrome and others are also within the present inventive scope.

One embodiment, provided for explanatory purposes only and not to limit the scope of the present invention is provided below:

Cyan: water, isopropyl alcohol, sodium lauryl sulphate, FD&C Blue #1

Magenta: water, isopropyl alcohol, sodium lauryl Sulphate, FD&C Red #3 & FD&C Blue #1

Yellow: water, isopropyl alcohol, sodium lauryl sulphate, FD&C Yellow #5

Black: water, isopropyl alcohol, sodium lauryl sulphate, FD&C Blue #1.

Other embodiments of the edible inks of the present invention that provide faithful matching to the CMYK color model, as well as other color models, and that function within the constraints of commercially available printing technologies are considered to be within the scope of the claimed invention.

Printer

The printing device 30, in the preferred embodiment, includes a feed path through which the item to be printed is inserted and conveyed past one or more printheads. In the preferred embodiment, the printhead technology can be any type of printhead which can be controlled by digital signals. In the preferred embodiment, print technology encompasses all types of inkjet print technology. In these systems, the edible inks described above are fed from a cartridge reservoir. These cartridge reservoirs may be refilled as need.

In one preferred embodiment, the printhead is a thermal inkjet printhead. Thermal inkjet printheads use a resistor which rapidly heats up a thin layer of the ink. This rapid heating causes the ink to form a bubble which ejects the ink through the nozzle. Since there are no mechanically moving parts, very high operating frequencies are possible.

In an alternative embodiment, the printheads use piezo inkjet technology. This technology uses a piezoelectric crystal to push and pull a diaphragm which lies beneath the firing chamber. The displacement caused by the movement of the diaphragm ejects the ink through the nozzle. The piezo inkjet can be either solid piezo inkjet technology or liquid piezo inkjet technology.

Other types of inkjet technology for use in the systems of the present invention include continuous inkjets, valve jets, electrostatic inkjets and airbrush technology. Also, as inkjet technology evolves, other inkjet technology may be incorporated into the systems of the present invention.

Other embodiments encompassing other digital printhead technology other than inkjet technology are considered within the scope of the invention as claimed as long as edible inks capable of precise color matching are usable. The descriptive embodiments of printhead technology are provided for explanatory purposes only and are not meant to unduly limit the scope of the claims of the invention.

In another alternative embodiment of the present invention, the image is printed onto a transfer layer, which in turn is applied onto the edible media.

Use

The use of the system of the preferred embodiment has been deliberately designed to be simple, with no computer skill necessary to operate. The system is able to be flexible in the capability of decorating a wide range of food products. The user first inserts the edible media into the feed path of the printer. Then, the user selects from the menu of image sources. The cake size is then selected and the number of copies chosen. Then the print process is activated. The image is then printed with the edible inks onto the media. The media is placed onto the food product, either on the site, or since it is compact and easily transportable, at the site of the event.

The user can select from several image sources, such as a scanner or image library. A personal photograph can be used to create the printed image by use of the scanner option. The scanner can be set to automatically detect the size of the image, or the user can manually select the size of the image if desired. The image library can be easily updated as desired.

The system is designed so that the user can easily adjust or update the system to incorporate future enhancements. The system uses a series of touch screen menus to enable the system use without the need of a computer keyboard.

Another feature of the present invention is the capability of the system to be operated through telecommunications or via an Internet site. A user could order the select or transmit an image to a remote site which could then print and ship the printed media via express delivery. The user could either order a cake, acquire one locally, or bake their own cake upon which the printed media could be placed. Also, the user may simply be able to go to a kiosk, input or select their image, and transmit this information then to a remote site. The remote site will then print the image on the media and ship it to the user, either on a food product or as is.

This descriptive embodiment is intended for explanatory purposes only. The present invention, as claimed, includes other implementations and embodiments as well.

What is claimed is:

1. A method for decorating a bakery product, comprising:

providing a bakery product to be decorated;

providing a printable edible medium to be applied to the bakery product;

inserting the printable edible medium into a printer modified by removing at least one rotating element from a printing path in the printer to facilitate the travel of the edible medium along the printing path;

selecting between at least two printing options, said print options including i) retrieving a scanned image and ii) retrieving a digital image from an alternate image source containing a plurality of digital images;

when the option of retrieving a scanned image is selected, pressing a single button to automatically scan and print the image onto said edible medium;

when the option of retrieving a digital image from the alternate image source is selected, selecting an image from the plurality of images and printing the selected image on the edible medium; and applying the image-bearing edible medium to the bakery product.

2. The method of claim 1, further comprising obtaining an original photograph to be scanned.

3. The method of claim 1, further comprising digitally editing the selected image prior to printing the image on the edible medium.

4. The method of claim 1, wherein the edible medium is edible paper.

5. The method of claim 1, further comprising optionally selecting a third print option, the third print option including retrieving a licensed image from a licensed image source.

6. The method of claim 5, further comprising disposing an original photograph on a flatbed scanner, generating an edible medium bearing a likeness of the original photograph, and applying the generated edible medium to a bakery product.

7. The method of claim 5, wherein the bakery product is a cake.

8. A method for manufacturing a system for decorating edible media, comprising:

providing an inkjet printer having a printing path;

removing at least one rotating member from the print path to facilitate the travel of an edible medium along the printing path;

coupling the printer to a scanner, a user interface and a control system that in response to activation of a single button causes an image to be scanned and transmitted to the printer; and providing an alternate image source containing a plurality of digital images, said alternate image source being coupled to the control system such that the control system may retrieve and transmit an image from the alternate image source to the printer in response to user input.

9. The method of claim 8, wherein the control system includes an image editing portion to modify a selected image in response to user input.

10. The method of claim 8, wherein the edible media comprises edible paper.

11. The method of claim 8, wherein the images include licensed images.

12. The method of claim 8, wherein the alternate image source includes clip-art or illustrations.

13. A system for decorating edible media to be applied to bakery products, comprising:

an inkjet printer modified by removal of at least one rotating member from the print path to facilitate the travel of a edible media along the printing path;

a scanner to generate a digital image;

an alternate image source containing a plurality of digital images; and a control system coupled to the printer, scanner and alternate image source to selectively retrieve and transmit to the printer a digital image from the scanner or the alternate image source, wherein the control system automatically retrieves and causes to be printed on the edible medium a digital image from the scanner in response to activation of a single button, without further intervention by a user.

14. The system of claim 13, wherein the control system includes an image editing portion to modify a selected image in response to user input.

15. The system of claim 13, wherein the edible media comprises edible paper.

16. The system of claim 13, wherein the digital images contained in the alternate image source include licensed images.

17. The system of claim 13, wherein the alternate image source includes clip-art or illustrations.

* * * * *

UNITED STATES PATENT AND TRADEMARK OFFICE
CERTIFICATE OF CORRECTION

PATENT NO.    : 6,903,841 B2
DATED         : June 7, 2005
INVENTOR(S)   : Stephen L. Spurgeon and Ronald B. Kammerer, Jr.

It is certified that error appears in the above-identified patent and that said Letters Patent is hereby corrected as shown below:

Column 1,
Line 8, after "1998" please insert -- , the entire disclosures of which are incorporated herein by reference --.

Column 10,
Lines 51-52, please delete "modified by removing at least one rotating element from" and insert -- having --.
Line 53, please delete "in the printer".
Line 54, please delete "along the printing path" and insert -- through the printer --.

Column 11,
Lines 20-21, please delete "; removing at least one rotating member from the print path".
Lines 22-23, please delete "along the printing path" and insert -- through the printer --.

Column 12,
Lines 10-11, please delete "modified by removal of at least one rotating member from the" and insert -- having a --.
Line 12, please delete "a edible media along the printing path" and insert -- an edible medium through the printer --.

Signed and Sealed this

Fifth Day of July, 2005

JON W. DUDAS
*Director of the United States Patent and Trademark Office*